INVENTORS
William James Rowley Clark
and
William Edward Hobbs
BY Baldwin & Wight
ATTORNEYS

COLOUR TELEVISION CAMERAS

Filed April 11, 1966 4 Sheets-Sheet 2

INVENTORS
William James Rowley Clark
and
William Edward Hobbs
BY Baldwin & Wight
ATTORNEYS

COLOUR TELEVISION CAMERAS

Filed April 11, 1966 4 Sheets-Sheet 3

INVENTORS
William James Rowley Clark
and
William Edward Hobbs
BY Baldwin & Wight
ATTORNEY.

INVENTORS
William James Rowley Clark
and
William Edward Hobbs
BY Baldwin & Wight
ATTORNEYS

United States Patent Office 3,471,634 Patented Oct. 7, 1969

3,471,634

COLOUR TELEVISION CAMERAS

William James Rowley Clark and William Edward Hobbs, Essex, England, assignors to The Marconi Company Limited, London, England, a British company Filed Apr. 11, 1966, Ser. No. 541,691
Claims priority, application Great Britain, May 7, 1965, 19,415/65
Int. Cl. H04n *1/46, 9/00, 5/38*
U.S. Cl. 178—5.2 15 Claims

ABSTRACT OF THE DISCLOSURE

Automatic registration of a colour television camera is carried out by obtaining signals from spaced reference areas outside the normal picture area, time-comparing these signals with electrically produced standard signals and using departures from simultaneity to provide signals for altering the position and dimensions of the scanning area and so to restore registration.

Figure 1:
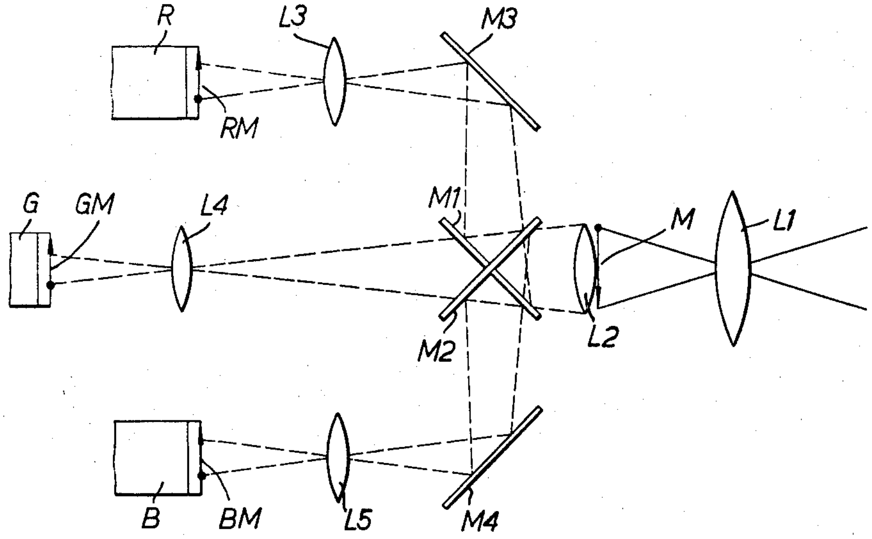

This invention relates to colour television cameras of the kind in which two or more camera photo-sensitive cathode ray tubes, are employed to scan a subject of transmission. There are a variety of different forms of camera of this kind. For example there are known colour cameras in which two camera tubes, one for each of two component colours, are employed, the third component colour signals being derived with the aid of the outputs from the two camera tubes by a method of subtraction. Another known and widely used form of camera employs three colour camera tubes one for each of the three component colours, red, green and blue.

Since in cameras of the kind referred to there is a plurality of camera tubes scanning the subject of transmission it is necessary, for good colour results, that the different cameras shall be quite accurately in register during scanning. Quite small registration errors can produce large colour errors. The usual pesent day practice as respects registration is to make the necessary adjustments for registration manually. Thus, for example, the output signals from the camera may be fed to a monitoring receiver of high quality and there used to reproduce a picture. With the aid of this picture the operator from time to time makes adjustments, by trial and error, to the scanning operations in the separate camera tubes so as to maintain as good quality as possible. Such manual adjustment is tedious and requires the continuous attention of a skilled operator, for it is by no means easy to do having regard to the number of individual adjustments which, for good results, must be provided in each camera. The present invention seeks to provide improved colour television cameras of the kind referred to wherein scanning in the individual camera tubes is maintained automatically in registration to a degree of accuracy which is good in practice and at least comparable with—and probably in practice better than—that obtained by manual adjustment.

According to this invention in its broadest aspect automatic registration of the tubes in a multi-tube colour television camera is obtained by time comparing separable signals obtained in the tube outputs by traversing spaced reference areas provided in the scanned area with electrically produced signals which, when the tube is in register, occur simultaneously therewith and utilising departures from simultaneity automatically to adjust the scanned area in position and dimensions so as substantially to restore registration.

According to a feature of this invention a colour television camera of the kind comprising a plurality of camera cathode ray tubes scanning a subject of transmission includes means for causing each tube to produce in scanning traversal of each of a plurality of reference areas at different predetermined positions in the scanned area thereof a separable reference signal in the tube output; means for deriving from wave forms employed in the camera to cause said tube to scan said area electrical signals which, when the tube is in register, occur at the same times as the reference output signals; and means for utilising departures from simultaneity of said reference output signals with said electrical signals for adjusting the scanning raster of said tube so as substantially to restore simultaneity.

Preferably the reference areas include at least three areas of which two are spaced apart in the line direction and two are spaced apart in the field direction. In a preferred arrangement there are eight reference areas arranged in two sets of three each in the line direction and two sets of three each in the field direction, each of the former sets of three consisting of two areas near the opposite ends of a line with a third area mid-way between them and each of the latter sets of three consisting of two areas near the opposite ends of a field with a third midway between them, the end areas of the former sets being common with the end areas of the latter sets.

Preferably the reference areas lie otuside the picture area proper and the separable reference output signals occur during line or field blanking periods.

Preferably the reference areas are areas provided on a mask an identical image of which is optically presented to each camera tube. In its preferred form the mask is arranged as a frame to the picture proper.

Preferably the means for adjusting the scanning raster of each tube comprise first means for adjusting the position of the raster in the line direction; second means for adjusting the position of the raster in the field direction; third means for adjusting the dimensions of the raster in the line direction; and fourth means for adjusting the dimension of the raster in the field direction. The first means may comprise means for varying a variable bias applied to the line deflection means of the tube; the second means may comprise means for varying a variable bias applied to the field deflection means of the tube; the third means may comprise means for varying the amplitude of a line deflecting wave form applied to the line deflection means of the tube; and the fourth means may comprise means for varying the amplitude of the field deflecting wave form applied to the field deflection means of the tube.

A preferred arrangement comprises means for deriving from the output signals of the tube a first reference signal occurring when scanning traversal of a pre-determined reference area in one line takes place; means for deriving from the output signals of the tube a second reference signal occurring when scanning traversal of a pre-determined refrence area in another line takes place; means for time comparing the said first and second reference signals respectively with first and second electrical signals which, if the tube is in register, will occur simultaneously therewith; means for utilising the resultant of one time comparison to shift the raster in the line direction and for utilising the resultant of the other time comparison to shift the raster in the field direction; means for deriving from the output signals of the tube a first pair of reference signals occurring one at scanning traversal of a reference area in one line and the other at scanning traversal of another reference in the same line; means for deriving from the output signals of the tube a second pair of reference signals one occurring at scanning traversal of a reference area in one line at a predetermined position along said line and the other occurring at scanning traversal of a reference area in another line at the same position along said other line; means for producing two pairs of electrical signals which, if the tube is in register will occur simultaneously with the two pairs of reference signals; further means for time comparing the occurrence of the interval between the reference signals of each pair with the occurrence of the interval between the electrical signals of the corresponding pair thereof; means actuated by output from one of said further time comparing means for adjusting the amplitude of line deflection if the two intervals compared thereby do not occur at the same time; and means actuated by output from the other of said further time comparing means for adjusting the amplitude of field deflection if the two intervals compared thereby do not occur at the same time.

In all cases time comparison is preferably effected by a differential amplifier and raster adjustment is effected under the control of a pair of mutually inhibited ramp function generators connected to the output of the differential amplifier.

A camera in accordance with this invention may comprise, for each tube, similar apparatus for separating reference signals from its output, time-comparing signals derived therefrom with electrical signals which, if the tube is in register, will occur at the same times, and producing control signals for shifting the tube raster as a whole if departures from simultaneity occur. However, in order to minimise duplication of such apparatus, the same apparatus for separating reference signals from its output, time-comparing signals derived therefrom with electrical signals which, if a tube is in register, will occur at the same times, and producing control signals for shifting the tube raster as a whole if departures from simultaneity occur, may be employed for all the tubes by switching their outputs and raster shifting means provided therefor, in turn to the said apparatus during intervals between fields. Again a camera in accordance with this invention may comprise, for each tube, similar apparatus for separating reference signals from its output, time-comparing signals derived therefrom with electrical signals which, if the tube is in register, will occur at the same time, and producing control signals for altering the dimensions of the tube raster if departures from simultaneity occur. As before, however, in order to minimise duplication of apparatus, the same apparatus for separating reference signals from its output, time-comparing signals derived therefrom with electrical signals which, if the tube is in register, will occur at the same times, and producing control signals for altering the dimensions of the raster may be employed for all the tubes by switching their outputs and raster dimension adjusting means provided therefor in turn to the said apparatus during intervals between fields.

Figure 2:
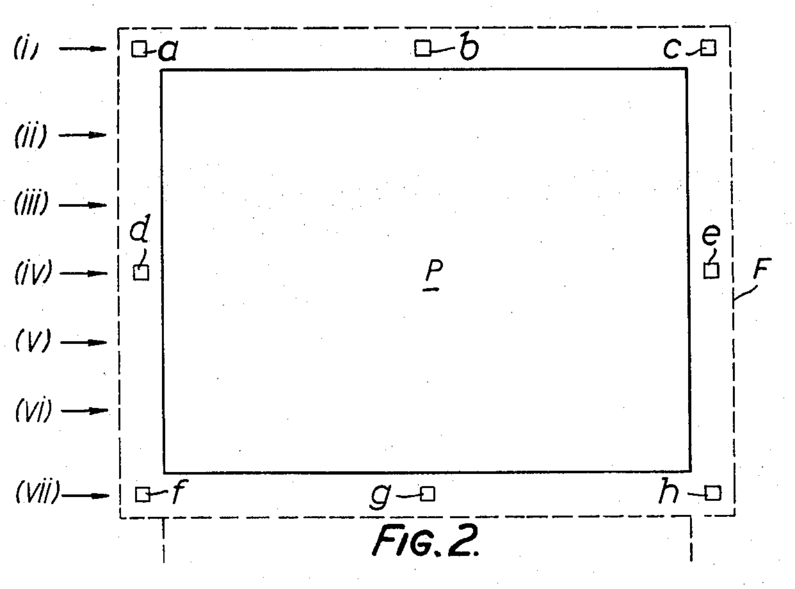
Figure 3:
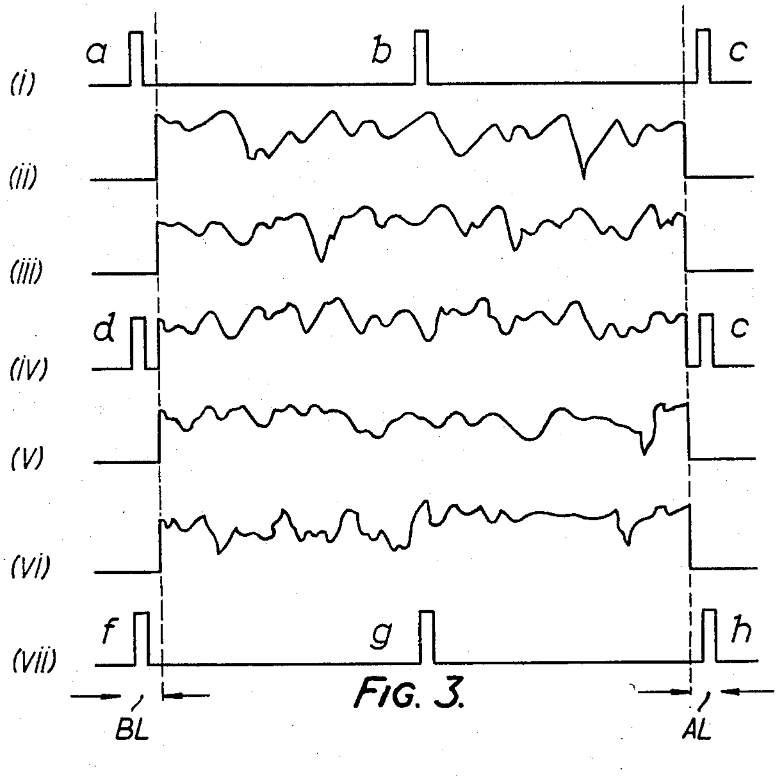
Figure 4:
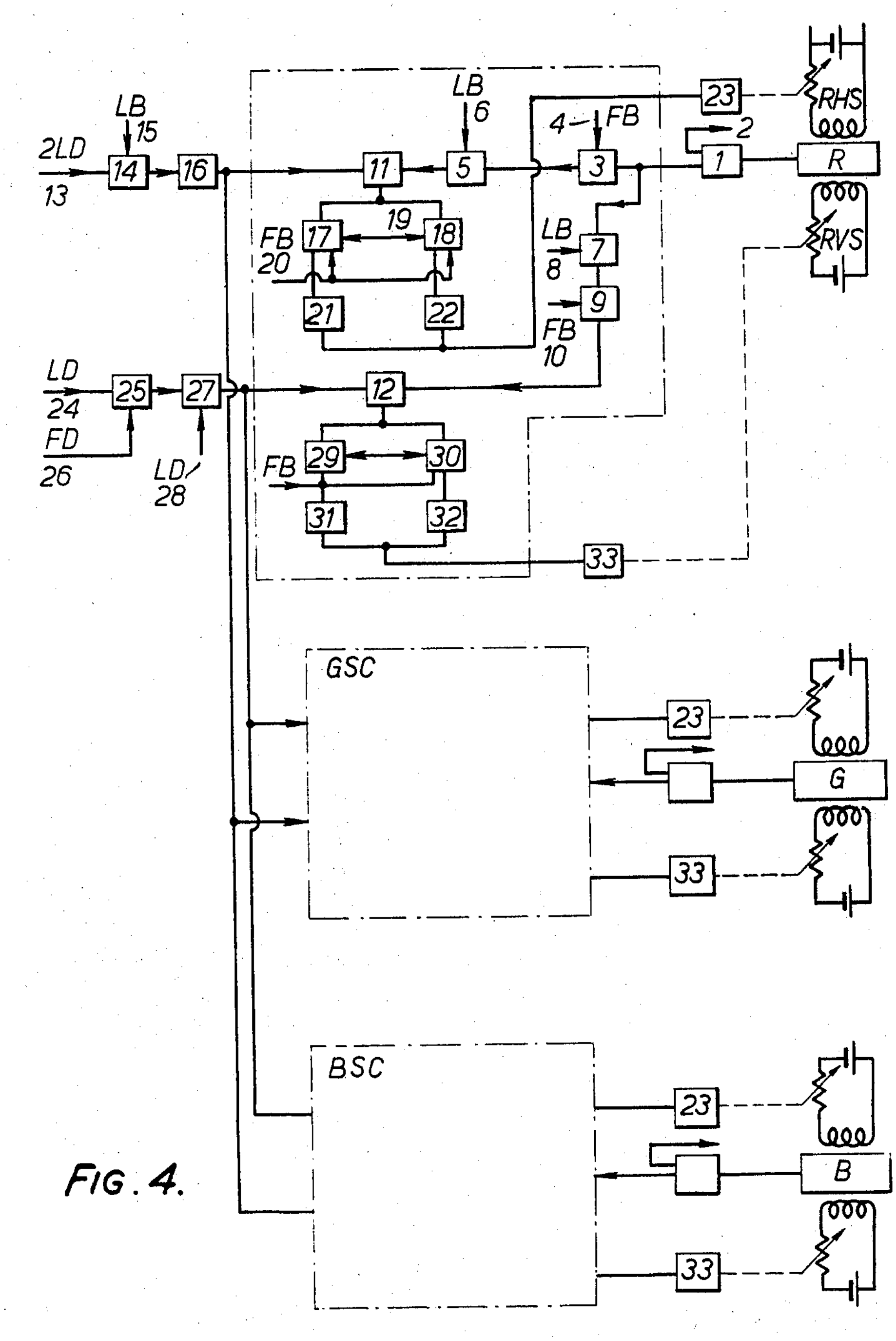
Figure 5:
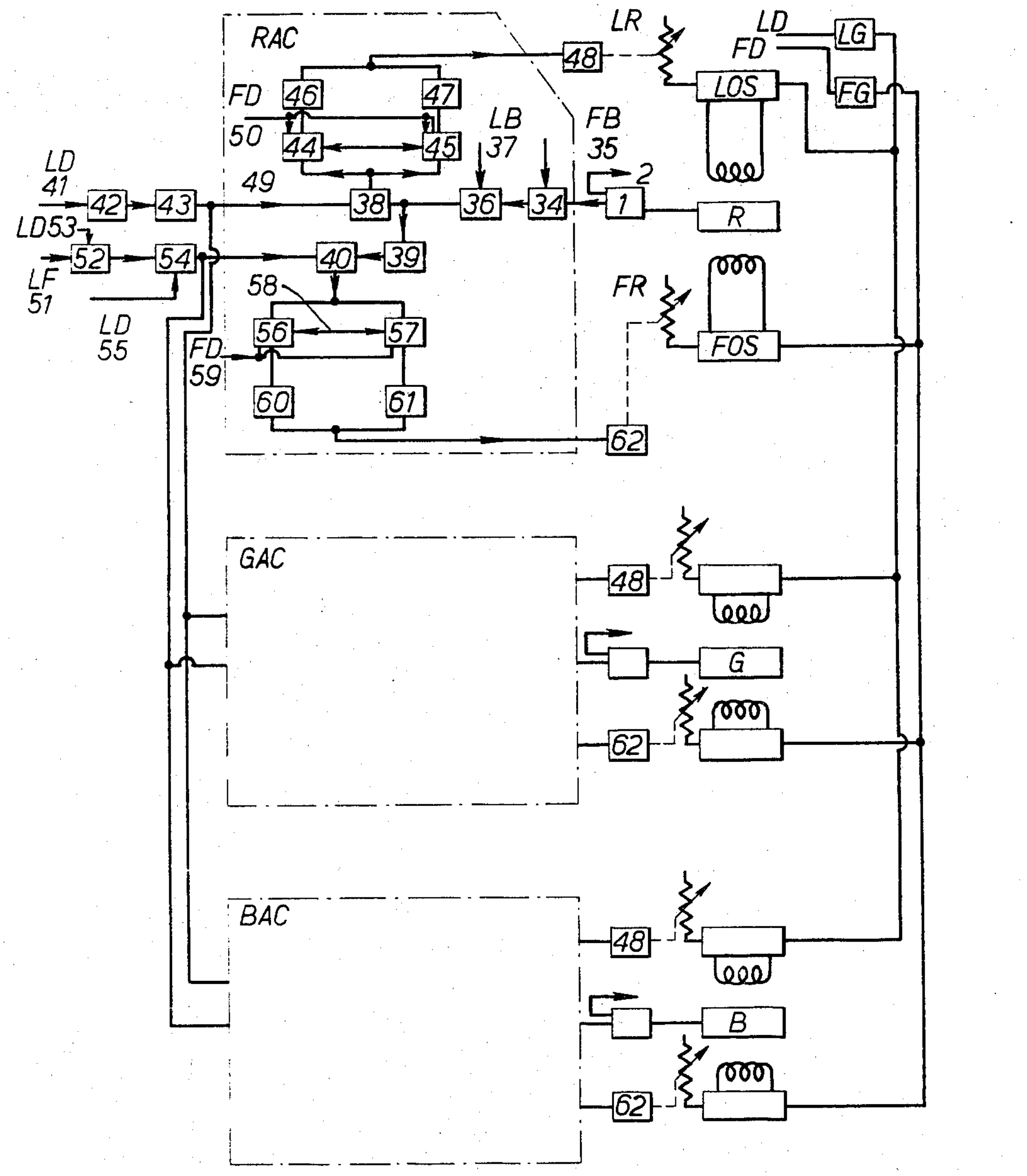

The invention is illustrated in and further explained in connection with the accompanying drawings in which FIGURE 1 is a schematic representation of an optical system which may be employed in a camera in accordance with this invention; FIGURE 2 shows a mask with reference areas employed in said camera; FIGURE 3 is an explanatory graphical figure related to FIGURE 2; FIGURE 4 is a diagram of one form of automatic raster shifting apparatus employed in said camera; and FIGURE 5 is a diagram of one form of automatic raster dimension adjusting apparatus employed in said camera. In FIGURES 4 and 5 the references LD, FD, LB, FB and 2LD indicate points at which, respectively, line drive pulses, field drive pulses, line blanking signals, field blanking signals and pulses at twice the line drive frequency are applied. The camera chosen for illustration is, as will appear more clearly later, one intended for operation in accordance with the present day interlaced 625 line television system though of course the invention is not limited to its application to cameras for operation in accordance with this particular system.

The preferred optical system shown schematically in FIGURE 1 uses a single reference mask represented purely schematically by the arrow M in the figure. An image of this mask is optically projected to each camera tube so as to provide a "frame" for the picture area scanned thereby. The three tubes, namely the "red" "green" and "blue" tubes are indicated at R, G and B respectively and the three images of the reference mask are indicated by arrows RM, GM and BM respectively. The optical system comprises the lens L1 which is the common objective lens of the whole colour camera; a common field lens L2; a pair of light splitting mirrors (dichroic mirrors) M1 M2; two further angled mirrors M3 and M4, for directing light to the "red" and "blue" tubes; and three relay lenses L3, L4, L5, one for each tube. In place of using an optical system to present an image of a single reference mask to each camera tube it would be possible to use three identical reference masks, one at each tube. The use of images of a single reference mask is, however, preferred to the use of three masks because of the necessity not only of making the masks as nearly as possible precisely alike but also of positioning them and maintaining them in each in the same relative position with respect to the scanned area of the camera tube with which it is associated and this involves problems of mechanical precision which the uses of images of one and the same mask avoids.

The image areas of the reference mask are illuminated and FIGURE 2 is a full view showing an image of the reference mask projected on to one of the camera tubes to constitute a "frame" for the picture area scanned thereby. This picture area is the inner rectangular area P. The "frame" is between this area and the outer broken line rectangle F. The reference mask, the image of which is shown in FIGURE 2 has eight small rectangular reference areas marked *a* to *h* inclusive and which are shown as black areas. Three of them (*a*, *b* and *c*) are in line across the middle of the top of the "frame," with the central one *b* mid-way between the other two; three of them (*f*, *g* and *h*) are in line across the middle of the bottom of the "frame" with, again, one of them (*g*) exactly central; and the remaining two (*d* and *e*) are exactly midway between *a* and *f* and *c* and *h* respectively.

The scanning in the tube (it is, of course, the same in all three tubes) is so arranged that scanning lines (assumed to be horizontal in FIGURE 2) traversing the top and bottom parts of the "frame" where the reference areas *a*, *b* and *c* and *f*, *g* and *h* are situated, do so in the pre-field and post-field blanking periods while other lines, which scan the picture area P, traverse the sides of the "frame" where the reference areas *a*, *d* and *f* and *c*, *e* and *h* are situated, during pre-line and post-line blanking periods. In this way signals produced by the reference areas occur outside the true picture signal periods and only during blanking periods so that they are readily separable. The arrow heads referenced (*i*) to (*vii*) inclusive shown to the left of FIGURE 2 indicate seven scanning lines selected by way of example and the camera tube signals produced during these lines are represented conventionally by the wave forms (*i*) to (*vii*) respectively of FIGURE 3. The pulses produced by traversal of the reference areas *a* to *h* respectively are also marked *a* to *h* respectively in FIGURE 3. The irregular wave forms are picture signals obtained in traversals of the picture area proper P. The pre-line and post-line blanking periods are indicated respectively at BL and AL at the outer edges of the bottom of FIGURE 3. It will thus be apparent that the camera tube, in scanning, produces separable pulses the timing of which are representative of the times of traversal of the reference areas. All three camera tubes produce separable pulses in similar manner from the mask image which is associated with it. Each of these pulses, produced by the three tubes should occur simultaneously in the outputs of all three and if they do not, correction for registration is necessary. Such correction may be achieved by time comparing certain of the pulses produced in the output from each tube with reference or timing pulses which are electrically produced and used as a basis of comparison with the tube output pulses to generate correcting signals which are then applied to correct scanning in any tube which is shown by such comparison to need it. Apparatus for deriving and applying such correction will now be described.

It is convenient, for the purposes of description, to regard the corrections necessary as divided into "shift" corrections and "amplitude" corrections, the former of which will be dealt with first. "Shift" ocrrections are corrections which shift the scanned pattern as a whole and "amplitude" corrections are corrections applied to the line and/or field amplitudes, i.e. corrections which effect the size of the raster as distinct from shift corrections which affect its position. One form of apparatus for securing shift correction will now be described with reference to FIGURE 4.

Referring to FIGURE 4, R represents the red camera tube and RHS and RVS represent respectively deflection circuits for producing deflections in the horizontal and vertical directions (line and field directions in the tube. Each of these circuits is represented schematically as including a bias D.C. source and a variable resistance, variation of the resistance in circuit RHS producing shift of the scanning raster horizontally and variation of the resistance in circuit RVS producing shift of the scanning raster vertically.

Output from the tube R is fed to the customary head amplifier 1 from which output for utilisation by a transmitter (not shown) is taken off at lead 2. Output from the amplifier 1 is also fed to a gate 3 which is normally closed but is opened to pass signals during the field blanking periods only. This is done by applying the standard field blanking wave form obtained from any convenient part (not shown) of the apparatus to the gate 3 over the lead 4. Accordingly the only signals passing the gate 3 will be the pulses *a*, *b*, *c*, *f*, *g* and *h* of FIGURE 3. These pulses are passed on to a second gate 5 which is normally open but is closed during the line blanking interval by applying the standard line blanking wave thereto over lead 6. The only signals passed by the gate 5 will accordingly be the pulses *b* and *g* of FIGURE 3. Suitable shaping circuits are incorporated in the gates 3 and 5 to ensure that their output pulses are of good squared shape and suitable amplitude.

Output from the amplifier 1 is also fed to a normally closed gate 7 which is opened by the line blanking wave form fed to it over lead 8 and which accordingly passes only the *a*, *d*, *f*, *c*, *e* and *h* pulses of FIGURE 3. These pulses are passed to a unit 9 which consists of a normally open gate adapted to be closed by the field blanking wave form fed to it over lead 10, and the output from which accordingly consists only of the pulses *d* and *e*. This gate is followed by a multi-vibrator, also included in unit 9, which produces from a pulses *d* and *e*, a long pulse commencing at pulse *d* and terminating at pulse *e*. The pulses *b* and *g* from the gate 5 are fed to one of the inputs of a differential amplifier 11 and the long pulse from unit 9 is fed to one of the inputs of a differential amplifier 12.

Pulses at twice the line frequency obtained in any convenient way from the normally provided synchronising generator (not shown) are applied at lead 13 to open a gate 14 which is re-closed by the line blanking wave form applied to it over lead 15. The output of the gate 14 will accordingly consist of pulses each of which (assuming a double interlaced television system in accordance with normal present day practice) occurs approximately in the middle of a scanning line—actually slightly in advance of this middle. These pulses are delayed by a delay line 16 to bring them exactly in the middle of the lines (in a practical case this would involve a delay of about 6 $\mu$sec.) and applied as the second input to the differential amplifier 11. The detail design is such that the two pulse inputs to the amplifier 11 are of the same pulse width and amplitude. If the pulses in the two inputs to the amplifier 11 occur simultaneously there will be no output but, in the absence of simultaneity, each pair of input pulses (one at each input) will result in two spaced output pulses of opposite polarities.

The output of the amplifier 11 is fed to a pair of ramp function generators 17, 18 as known per se. One of these generators 17 is adapted to be triggered by a positive pulse and, when triggered, to produce a voltage which becomes more positive approximately linearly at a pre-determined rate until a negative pulse is applied to the generator. The other generator 18 is adapted to be triggered by a negative pulse and, when triggered, to produce a voltage which becomes more negative approximately linearly at the same pre-determined rate until a positive pulse is applied to the generator. The two generators are inter-connected in know manner so that, when one is triggered the other is inhibited i.e. cannot be triggered until reset. This interconnection is represented by lead 19. Resetting of the generators to their "rest" condition is effected by the field blanking wave form which is applied over lead 20 to the two generators. The outputs from the two generators are fed to peak detectors 21 and 22 respectively which produce outputs respectively representative of the maximum positive and negative voltages reached by the generators 17 and 18 in their respective ramp excursions. These detected outputs are fed to any suitable horizontal shift control circuit 23 which is represented as mechanically adjusting the resistance in the circuit RHS. In practice a mechanical control need not be used: for example the detected outputs could be amplified by a D.C. amplifier injecting bias voltage into the circuit RHS.

It will be seen, therefore, that if the two pulse inputs to amplifier 11 are not simultaneous one or other of the generators 17 or 18 will make a voltage excursion of magnitude dependent upon the departure from simultaneity and this voltage excursion will produce a horizontal shift in the raster in the required direction.

Pulses at line frequency are fed over lead 24 to a counter-divider 25 which is adapted to make (when reset) a count of half the lines in a field. In an interlaced 625 line system the count would be 175. Resetting of the divider is effected by field pulses fed in over lead 26. The output from the counter is therefore a square wave which changes polarity approximately in the middle of the effective picture field. This output is fed to a multivibrator 27 which is switched to one condition of stability when said change of polarity occurs and switched back by the next succeeding line drive pulse which is fed to it over lead 28. The output from 27 is therefore a pulse one line long and this is fed as the second input to the amplifier 12.

Output from the amplifier 12 is fed to opposite polarity ramp function generator 29 and 30 followed by peak detectors 31 and 32 the outputs of which are fed to a vertical shift control circuit 33 providing correcting vertical shift if the two inputs to amplifier 12 are not simultaneous. The functions of the parts 29, 30, 31, 32 and 33 correspond, as regards vertical shift correction, to those of the parts 17, 18, 21, 22 and 23 for horizontal shift correction and further description of the former parts is therefore deemed unnecessary.

Similar shift control circuits are provided for the green and blue camera tubes. These circuits are not shown in detail but are within the dotted line blocks GSC and BSC the apparatus within which is like that within the dotted line block RSC. Each arrangement GSC and BSC feeds its own control units, which are also marked 23 and 33.

It will be seen that the three shift control circuits within the blocks RSC, GSC and BSC are similar and as will be obvious, it is possile therefore, to modify FIGURE 4 by using one and the same control circuit for all three camera tubes by suitably switching it over in time. All that is required for this modification is a suitably timed switch which connects the outputs of the three head amplifiers in turn to the gates 3 and 7, the outputs of the detectors 31 and 32 to the three control units (all marked 33 in FIGURE 4) in turn, and the outputs of the detectors 21 and 22 to the three control units (all marked 23 in FIGURE 4) also time rate of switching is not critical but it should occur in field blanking periods e.g. every 10 fields. In this modification the control units should of course be of appropriately good "memory" i.e. each should be such that, when adjusted to a particular value of shift (horizontal or vertical as the case may be) it should retain that value until set to a different adjustment next time the camera tube with which it is associated is switched over to the control circuit arrangement RSC, GSC or BSC, as the case may be.

FIGURE 5 shows the apparatus for amplitude correction. The three camera tubes are shown again at R, G and B and the line and field scanning coils are shown again as in FIGURE 4, the coil shown above each tube being for horizontal deflection and the coil shown below each tube being for vertical deflection. In FIGURE 5 the line and field scan output stages are shown at LOS and FOS respectively. These are driven from line and field generators LG and FG controlled by line and field drive (synchronising) pulses fed thereto as indicated. Control of the amplitudes of the outputs from LOS and FOS is schematically represented as effected by variation of the values of the variable resistance LR and FR respectively. Output from the red tube R is fed to the head amplifier 1 whose output will, as already stated include pulses *a* to *h* inclusive. This output, as well as being fed to the utilisation output lead 2 and to the gates 3 and 7 of FIGURE 4 is fed to a normally closed gate 34 opened by field blanking pulses fed in over lead 35 and which is followed by a normally closed gate 36 which is opened by line blanking pulses fed in over lead 37. At the output of gate 36, therefore, only the pulses *a*, *c*. *f*, and *h* will appear. The gates 34 and 36 include suitable pulse shaping circuits. The output from gate 36 constitutes one input to a differential amplifier 38 and is also fed to a multivibrator 39 which is switched over to one of its two states by alternate input pulses and switched back again by the other alternate input pulses. The output from 39 will therefore comprise a pulse one line long starting at pulse *a* and finishing at pulse *c* and a pulse, also one line long, starting at pulse *f* and finishing at pulse *h*. These pulses are fed as one input to a differential amplifier 40.

Line drive pulses are applied at lead 41 to a monostable multivibrator 42 adapted to be triggered to one state by the leading edge of one line drive pulse and to return to its other state after a pre-determined time interval such that said return occurs just before the end of the line blanking period. In a double interlaced 625 line system a practical value of this time interval would be 10.5 $\mu$sec. The output from 42 is fed to a pulse generator 43 which produces a short rectangular pulse from the return of the multi-vibrator 42 to said other state. This pulse constitutes the second input to the differential amplifier 38 and is arranged to be of the same length and amplitude as the input pulse from gate 36. The output of the amplifier 38 is fed to a pair of ramp function generators 44 and 45, one positive going and the other negative going, respectively followed by peak detectors 46 and 47 the outputs from which actuate a control unit 48 (for convenience shown as an electro-mechanical control unit though a purely electrical control unit could be used) controlling the amplitude of the output from LOS. The ramp function generators 44 and 45 inhibit one another as before over inter-connection 49 and are re-set by field drive pulses fed in over lead 50. It will be seen therefore that if the pulse in the output from tube R is not co-incident with a pulse which should occur at the same time from unit 43 one or other ramp generator commences a voltage excursion which starts on the earlier of these pulses and ceases on the later of them and an amplitude correction, dependent on the interval between these pulses is applied to the output circuit LOS. Because of the inter connection 49, triggering of either ramp function generator prevents either of them from being triggered until after a re-setting pulse has been fed in from lead 50 and accordingly no action is produced on either ramp function generator by the pulses *e*, *f* and *h*. Since the apparatus of FIGURE 4 ensures that the reference mark *b* of FIGURE 2 is traversed at the right time the apparatus of FIGURE 5 as so far described will ensure that the time of traversal from reference mark *a* to reference mark *b* will be correct.

Field drive pulses are applied over lead 51 to a delayed return multi-vibrator 52 which is triggered into one state by a field drive pulse and returned to its original state by the first line drive pulse occurring after a time interval set to cover a pre-determined number of lines. For example, in a practical case, the multi-vibrator would be triggered back to its original state by the fifth line drive pulse occurring after it has assumed said one state. In such a case the multi-vibrator would be inhibited from being triggered back to its original state, (once triggered into said one state) for a period slightly more than that occupied by four lines. Such multi-vibrators are known per se and require no detailed description herein. The line drive pulses are fed in to multi-vibrator 52 over lead 53. The multi-vibrator 52 controls a bistable multivibrator 54 which is triggered into one state when the said multi-vibrator 52 is triggered back and which is returned to its original state by the next following line drive pulse fed to it over lead 55. The output pulse from 54 is therefore one line long (approximately the same length as the pulse from 39) and is fed as the second input to the differential amplifier 40. The pulses from 54 and 39 are made of substantially the same amplitude. If there is any material departure from the condition of simultaneity as respects these pulses from 54 and 39 the output from differential amplifier 40 initiates a ramp voltage excursion in one or other of the ramp function generators 56 and 57 one of which is positive going and the other of which is negative going. As in the case of the other pairs of ramp function generators, the generators 56 and 57 are interconnected by a mutually stabilising link 58. The said generators 56 and 57 are reset by field drive pulses applied over lead 59 and are followed by peak detectors 60 and 61 which provide output for a control unit controlling the amplitude of the field deflection circuit FOS. Accordingly, if the output pulse from 39, which is one line long and occurs during traversal from reference mark *a* (FIGURE 2) to reference mark *c* does not occur in simultaneity with an output pulse one line long from 54 and corresponding to a particular predetermined numbered line during the field—in the example given the fifth line—a field amplitude correction is applied to FOS.

Similar amplitude control circuitry is provided for the green and blue tubes the chain line blocks GAC and BAC being presumed to contain circuitry similar to that contained in the chain line block RAC.

As in the case of FIGURE 4, unnecessary duplication of circuits can be avoided by using only one control circuit arrangement e.g. RAC for all three tubes and switching it over to the three tubes in turn, i.e. by switching the head amplifiers in turn to the gate 34, switching the outputs from 60 and 61 to the three control units 62 in turn, and switching the outputs from 46 and 47 to the three control units 48 in turn. As before switching should be effected in field blanking periods but to minimise the risk of mutual interference it is preferred to effect switching in FIGURE 5 in moments between successive switching operations of the above described modification of FIGURE 4.

It will be observed that the only mask reference areas actually employed to secure automatic registration are the areas *a, b* and *d,* and, theoretically, these areas are the only ones that need be provided. The illustrated arrangement of FIGURE 2 with eight reference areas is, however, preferred because it is symmetrical and therefore allows the line direction of scanning and/or the field direction of scanning to be reversed with impunity. This may be convenient in some cases, e.g. in tele-cinematography or where a camera has to view a scene in a mirror, as often occurs in television for medical teaching and surveillance purposes.

In the specific embodiment above described the reference areas *a* to *h* inclusive are outside the scanned area from which picture information proper is obtained. This is preferred for reasons of simplicity but it has the defect of involving waste of a certain amount of flyback or retrace time. Though this is not regarded as a serious defect practically, it can be avoided, for it is not essential to have these reference areas outside the scanned area from which picture signals proper are derived. Television reproducer tubes in general have, in practice, viewing areas which have well connected corners and usually curved sides as well. Always, in practice, the area covered by the scanning raster of a television reproducer tube overlaps the viewed area all round and it is possible therefore to locate the reference areas in the area of overlap. Another possibility is that of not having the reference areas effectively present all the time but to bring them into effective use during individual fields which are well spaced apart in time, e.g., one field in every fifty, and shutter off the picture during these particular fields. Thus, for example, a shutter driven at a suitable speed related to the field frequency could be used to shutter off the picture proper from the camera every (say) fiftieth field and expose a suitable pattern of reference areas to the camera during those fields. If the interval between successive fields in which the picture proper is shuttered off are sufficiently long and the reference areas are suitably chosen and positioned—preferably as far away from the centre as possible and as few as possible—the loss of the well spaced picture fields and the insertion of the reference area pattern instead could, it is thought, be made acceptable to a viewer of the reproduced pictures or even not noticeable at all.

We claim:

1. A colour television camera including a plurality of camera tubes and means for providing spaced reference areas outside the normal picture area and inside the scanned area, means for obtaining from each of said camera tubes output signals which include picture signals and reference area signals, means for separating reference area signals from said output signals, means for time-comparing said reference area signals with electrically produced signals which, when the tube is in register, occur simultaneously therewith, and means for utilising departures from simultaneity automatically to adjust the scanned area in position and dimensions so as substantially to restore registration.

2. A camera as claimed in claim 1 wherein the reference areas include at least three areas of which two are spaced apart in the line direction and two are spaced apart in the field direction.

3. A camera as claimed in claim 2 wherein there are eight reference areas arranged in two sets of three each in the line direction and two sets of three each in the field direction, each of the former sets of three consisting of two areas near the opposite ends of a line with a third area mid-way between them and each of the latter sets of three consisting of two areas near the opposite ends of a field with a third mid-way between them, the end areas of the former sets being common with the end areas of the latter sets.

4. A camera as claimed in 1 wherein the reference areas are areas provided on a mask an identical image of which is optically presented to each camera tube.

5. A camera as claimed in claim 4 wherein the mask is arranged as a frame to the picture proper.

6. A camera as claimed in claim 1 and comprising for each tube similar apparatus for separating reference signals from its output, time-comparing signals derived therefrom with electrical signals which, if the tube is in register, will occur at the same times, and producing control signals for shifting the tube raster as a whole if departures from simultaneity occur.

7. A camera is claimed in claim 1 and comprising for all the tubes the same apparatus for separating reference signals from its output, time-comparing signals derived therefrom with electrical signals which, if a tube is in register, will occur at the same times, and producing control signals for shifting the tube raster as a whole if departures from simultaneity occur, the said same apparatus being employed for all the tubes by switching their outputs and raster shifting means provided therefor, in turn to the said apparatus during intervals between fields.

8. A camera as claimed in claim 1 and comprising for each tube, similar apparatus for separating reference signals from its output, time-comparing signals derived therefrom with electrical signals which, if the tube is in register, will occur at the same times, and producing control signals for altering the dimensions of the tube raster if departures from simultaneity occur the same apparatus for separating reference signals from its output, time-comparing signals derived therefrom with electrical signals which, if the tube is in register, will occur at the same times, and producing control signals for altering the dimensions of the raster being employed for all the tubes by switching their outputs and raster dimension adjusting means provided therefor in turn to the said apparatus during intervals between fields.

9. A colour television camera of the kind comprising a plurality of camera cathode ray tubes for scanning a subject of transmission, said cameras including means for providing a plurality of reference areas at different pre-determined positions in the scanned area and only outside the normal picture area thereof for causing each tube to produce in scanning traversal of each of said plurality of reference areas a separable reference signal in the tube output; means for deriving from a wave form employed in the camera to cause said tube to scan said area, electrical signals which, when the tube is in register, occur at the same times as the reference output signals; and means for utilising departures from simultaneity of said reference output signals with said electrical signals for adjusting the scanning raster of said tube so as substantially to restore simultaneity.

10. A camera as claimed in claim 9 wherein the means for adjusting the scanning raster of each tube comprise first means for adjusting the position of the raster in the line direction; second means for adjusting the position of the raster in the field direction; third means for adjusting the dimension of the raster in the line direction; and fourth means for adjusting the dimension of the raster in the field direction.

11. A camera as claimed in claim 10 wherein the first means comprise means for varying a variable bias applied to the line deflection means of the tube; the second means comprise means for varying a variable bias applied to the field deflection means of the tube; the third means comprise means for varying the amplitude of a line deflecting wave form applied to the line deflection means of the tube; and the fourth means comprise means for varying the amplitude of a field deffecting wave form applied to the field deflection means of the tube.

12. A camera as claimed in claim 11 comprising means for deriving from the output signals of the tube a first reference signal occurring when scanning traversal of a pre-determined reference area in one line takes place; means for deriving from the output signals of the tube a second reference signal occurring when scanning traversal of a pre-determined reference area in another line takes place; means for time comparing the said first and second reference signals respectively with first and second electrical signals which, if the tube is in register, will occur simultaneously therewith; means for utilising the resultant of one time comparison to shift the raster in the line direction and for utilising the resultant of the other time comparison to shift the raster in the field direction; means for deriving from the output signals of the tube a first pair of reference signals occurring one at scanning traversal of a reference area in one line and the other at scanning traversal of another reference area in the same line; means for deriving from the output signals of the tube a second pair of reference signals one occurring at scanning traversal of a reference area in one line at a pre-determined position along said line and the other occurring at scanning traversal of a reference area in another line at the same position along said other line; means for producing two pairs of electrical signals which, if the tube is in register will occur simultaneously with the two pairs of reference signals; further means for time comparing the occurrence of the interval between the reference signals of each pair with the occurrence of the interval between the electrical signals of the corresponding pair thereof; means actuated by output from one of said further time comparing means for adjusting the amplitude of line deflection if the two intervals compared thereby do not occur at the same time; and means actuated by output from the other of said further time comparing means for adjusting the amplitude of field deflection if the two intervals compared thereby do not occur at the same time.

13. A camera as claimed in claim 10 wherein comparison is effected by a differential amplifier and raster adjustment is effected under the control of a pair of mutually inhibited ramp function generators connected to the output of the differential amplifier.

14. A colour television camera including a plurality of camera cathode ray tubes for scanning a subject of transmission, means for providing spaced reference areas in the scanned area of a tube, means for detecting positional raster registration in the line direction including means for comparing the time at which scanning of at least one of said reference areas occurs with the time of occurrence of a predetermined reference signal and means for detecting positional raster registration in the field direction including a further means for comparing the time at which scanning of at least one of said reference areas occurs with the time of occurrence of a further predetermined registration reference signal.

15. A colour television camera including a plurality of camera cathode ray tubes for scanning a subject of transmission, means for providing spaced reference areas in the scanned area of a tube, means for detecting positional raster registration including means for comparing the time at which scanning of at least one of said reference areas occurs with the time of occurrence of a predetermined reference signal and means for detecting dimensional extent of the raster in at least one of said line and field directions including further means for comparing the time at which scanning of at least one of said reference areas occurs with the time of occurrence of a further predetermined reference signal.

References Cited

UNITED STATES PATENTS

| | | | |
|---|---|---|---|
| 2,594,382 | 4/1952 | Bedford | 178—5.2 |
| 2,594,383 | 4/1952 | Bedford | 178—5.2 |
| 2,611,816 | 9/1952 | Darke | 178—5.2 |
| 3,089,978 | 5/1963 | Bendell et al. | 178—5.4 |

RICHARD MURRAY, Primary Examiner

U.S. Cl. X.R.

178—5.4